(12) United States Patent
Thijssen

(10) Patent No.: US 6,217,110 B1
(45) Date of Patent: Apr. 17, 2001

(54) OPEN ROOF CONSTRUCTION FOR A VEHICLE

(75) Inventor: Edwin Johannes Richardus Wilhelmus Thijssen, Haps (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/304,940

(22) Filed: May 4, 1999

(30) Foreign Application Priority Data

May 6, 1998 (NL) .................................................. 1009071

(51) Int. Cl.[7] .................................. B60J 7/12; B60J 7/22
(52) U.S. Cl. ............................................. 296/217; 296/219
(58) Field of Search ................................. 296/217, 219, 296/180.1

(56) References Cited

U.S. PATENT DOCUMENTS

| | | | |
|---|---|---|---|
| 4,291,912 | * 9/1981 | Fox et al. ............................. | 296/217 |
| 5,601,330 | 2/1997 | Ulbrich et al. ....................... | 296/217 |

FOREIGN PATENT DOCUMENTS

| | | | |
|---|---|---|---|
| 41 23 229 | 1/1997 | (DE) . | |
| 196 36 683 | 10/1997 | (DE) . | |
| 2 257 669 | 1/1999 | (GB) ................................... | 296/219 |

* cited by examiner

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof, which comprises a frame part to be secured to the roof and an adjustable closing element supported by said frame part, which is adjustable between a closed position and an open position. The closing element comprises at least one rigid plate, which is capable of pivoting movement about a first pivot pin with respect to a part disposed before said rigid plate, which part remains stationary during said pivoting movement. The plate and the part disposed before said plate are fixedly interconnected by means of a flexible sealing element. The plate may make up a wind deflector or part of the closing element.

19 Claims, 4 Drawing Sheets

OPEN ROOF CONSTRUCTION FOR A VEHICLE

BACKGROUND OF THE INVENTION

1. Field of the Invention

The invention relates to an open roof construction for a vehicle.

2. Description of the Related Art

Such an open roof construction is known in several versions thereof, wherein the plate may close the entire roof opening or only function as a front panel or as a wind deflector. In order to prevent wind entry at the front edge of the plate in the upwardly pivoted position of the plate, a sealing element is provided, which is secured either to the plate or to the stationary part disposed before said plate, while the other part is in engagement therewith and must remain so. Several vertical adjusting mechanisms have been developed to ensure that the front edge of the plate indeed remains in engagement with the seal. With the increase of the transverse curvature of vehicle roofs and the increasingly round shape of the front edge of the roof opening, and thus of the closing elements of open roof constructions, it is becoming increasingly difficult to maintain the seal on the front side of the plate in the various positions of the plate.

SUMMARY OF THE INVENTION

The object of the invention is to further improve the open roof construction of the type referred to in the introduction.

In order to accomplish that objective, the open roof construction according to the invention is characterized in that the plate and the part disposed before said plate are fixedly interconnected by means of a flexible sealing element.

By using a flexible sealing element, which is fixedly connected to the front side of the plate and to the rear side of the part that remains stationary, tightness on the front side of the plate is ensured. Preferably, a stretchable or foldable sealing element is used, which is capable of absorbing variations that occur during the pivoting of the plate both in the transverse direction of the plate and in the distance between the front side of the plate and the rear side of the stationary part.

In one embodiment of an open roof construction in which the invention can be used, the plate forms a wind deflector, which is disposed proximate the front side of the roof opening and which is adjustable between a swung-down, inoperative position and a raised, operative position.

The flexible sealing element may for example be made of a cloth-like material extending over the plate, and in one embodiment of the open roof construction, wherein the open roof construction forms a folding roof, and the closing element is provided with a foldable main closing element, it is advantageous if the main closing element is provided with the same cloth-like material on the upper side, which in that case extends over the entire area of all parts of the closing element.

Preferably, the aforesaid stationary part also consists of a plate, whose upper side is flush with the upper side of the, preferably, plate-shaped wind deflector in the inoperative position of said wind deflector. In this embodiment, the front stationary plate may be sealed in a traditional manner with respect to the frame by means of a sealing section, while the front plate and the wind deflector are interconnected via the flexible sealing element. In the closed position of the wind deflector, the division between the two parts is not visible, since the cloth-like sealing element extends tautly over both plates.

Alternatively, the pivotable plate could also be disposed on the rear side of the main closing element and function as a ventilating flap there.

The invention will be explained in more detail hereafter with reference to the drawings, which show an embodiment of the open roof construction according to the invention.

DESCRIPTION OF THE PREFERRED EMBODIMENT

Figure 1:
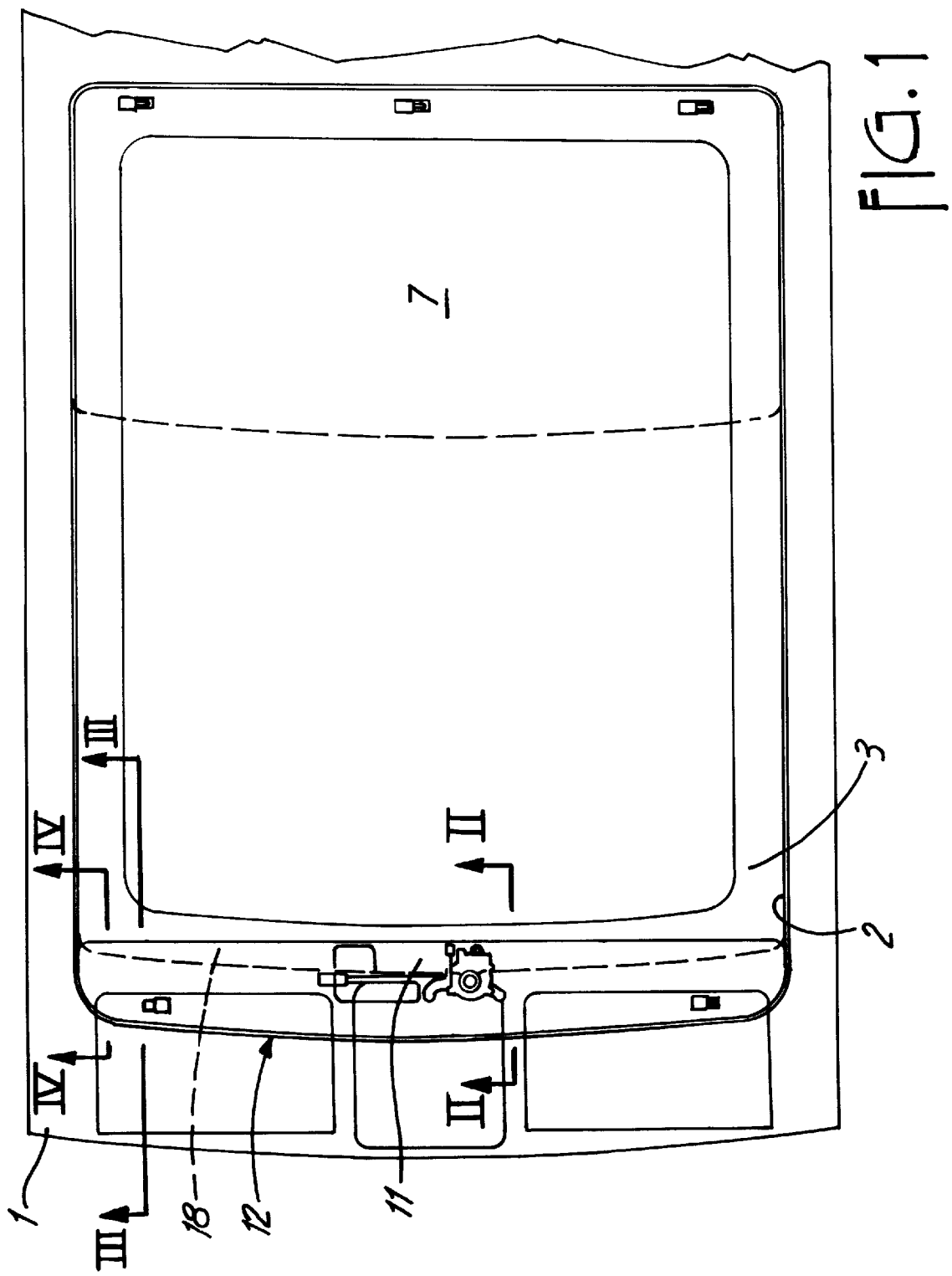
FIG. 1 is a schematic plan view of the embodiment of the open roof construction according to the invention.
Figure 2:
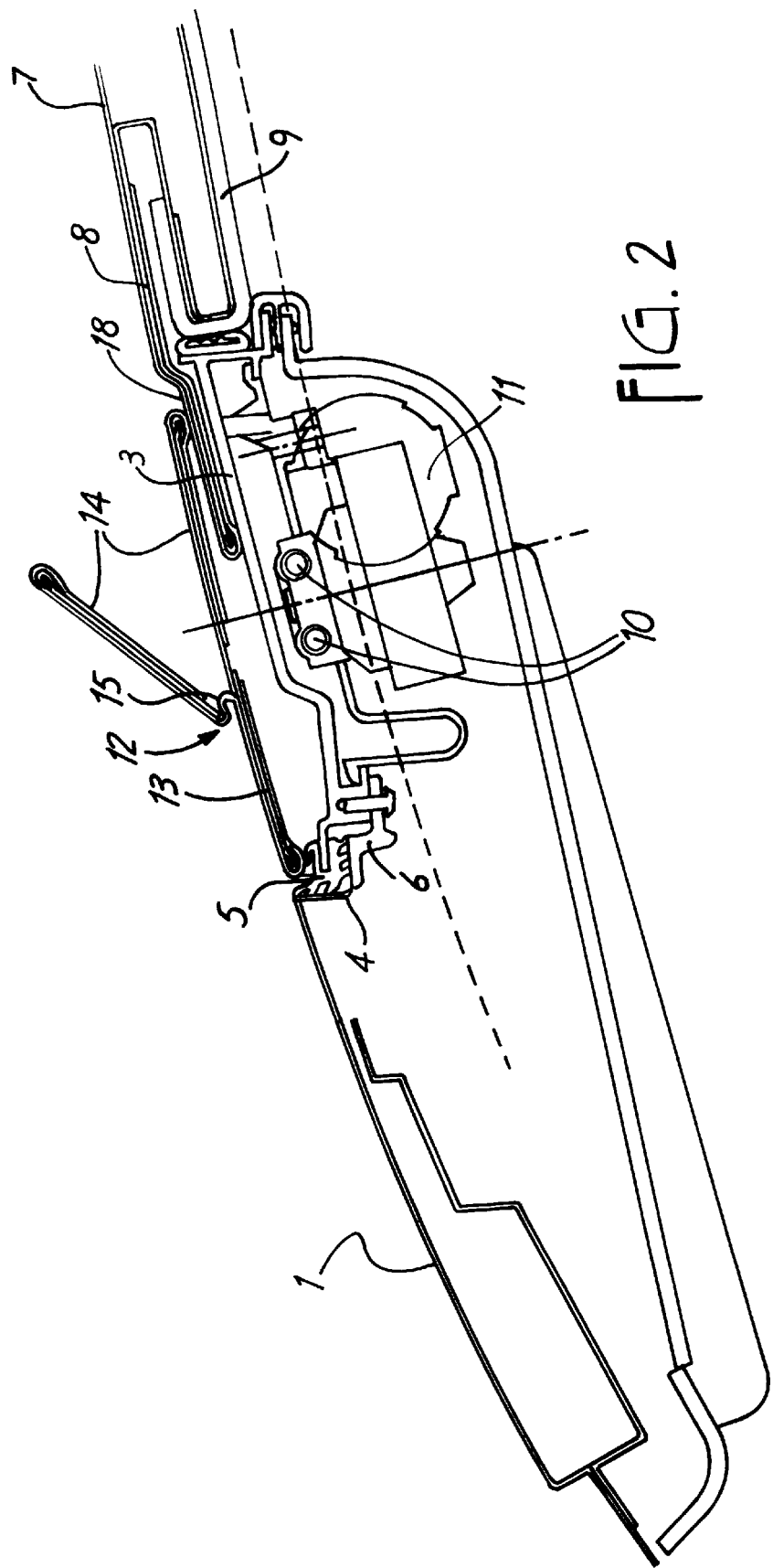
FIGS. 2, 3 and 4 are schematic longitudinal sectional views along, respectively, lines II—II, III—III and IV—IV in FIG. 1.

The drawings show an embodiment of an open roof construction for a vehicle, in particular a passenger car, whose fixed roof 1 is provided with a roof opening 2 which is recessed therein. The open roof construction is of the top loading type, comprising a stationary frame 3 which can be mounted in roof opening 2 from above. In the illustrated embodiment, roof opening 2 is provided with a recessed edge 4, in which the frame 3, is sealingly mounted by means of a circumferential seal 5, after which a clamping member 6 of frame 3 secures frame 3 to the recessed edge 4 of fixed roof 1. This construction comprising a recessed edge 4 is in particular intended for direct mounting of the open roof construction while the vehicle is being manufactured, in case of subsequent mounting, frame 3 will rest on top of fixed roof 1 with a flat flange in most cases.

The illustrated embodiment of the open roof construction according to the invention includes a folding roof comprising a foldable cover 7, which consists of cloth material which is secured on the front side to a plate 8, which is connected to an operating beam 9 or formed integrally therewith. Operating beam 9 functions to open and close the cover 7. To this end, operating beam 9 can be moved forwards and backwards in guide rails disposed at the edges of the roof opening 2 by means of adjusting elements, which adjusting elements can be moved by means of driving elements, such as pull-push cables 10, which can be moved by means of a driving motor 11 or the like for the purpose of moving operating beam 9 and thus opening and closing the folding roof.

As is shown in the drawings, a panel 12 is provided at the front edge of roof opening 2 along the whole width of the cover, which panel is a two-part panel consisting of a front plate 13, which remains stationary, and a plate 14 which is pivotally mounted with respect thereto, which in this embodiment functions as a wind deflector. The division between the two plates 13 and 14 takes place along a straight line. The curved front edge of the stationary plate 13 is in constant engagement with the upper side of circumferential seal 5 of the frame, forming a reliable seal at that location. Plate 13 and wind deflector 14 are jointly lined with a one-piece cloth-like material, which is the same material as the material of the cover 7 of the folding roof. The cloth-like material 15 functions as a flexible and foldable connection between the rear edge of plate 15 and the front edge of wind deflector 14.

Figure 3:
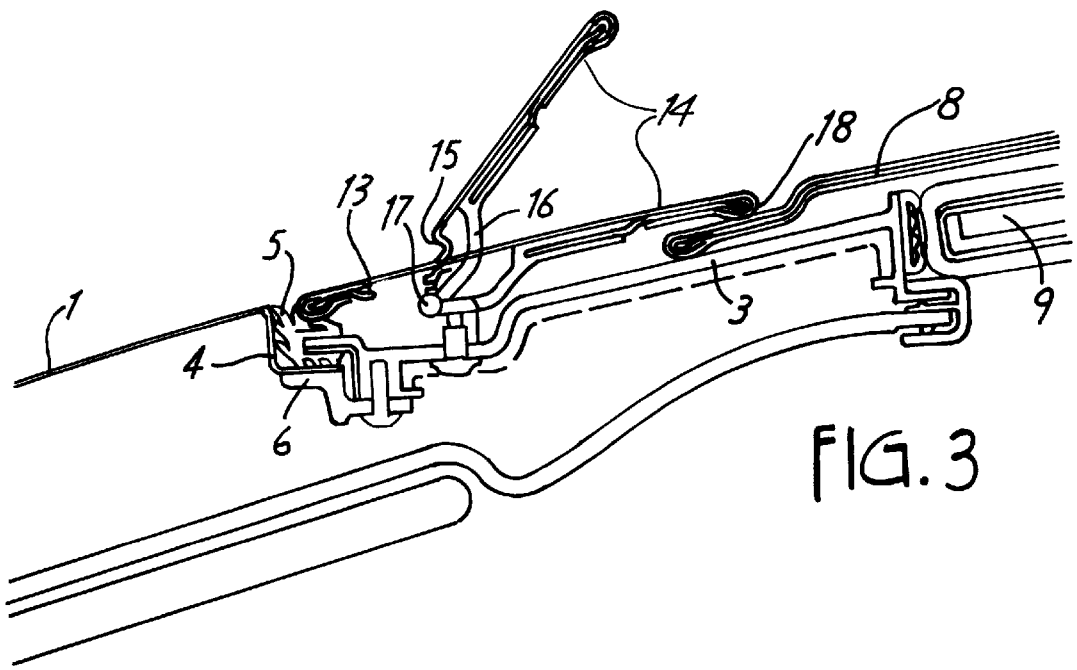

Wind deflector 14 includes an arm 16 (FIG. 3) near both lateral sides, which arm extends in forward and downward direction from the underside of wind deflector 14, and which is pivotally connected to frame 3 by means of an associated pivot pin 17. Said pivot pins 17 are positioned more or less under the rear edge of plate 13, in such a manner that when wind deflector 14 pivots with respect to plate 13, the distance between plate 13 and wind deflector 14 will not increase as wind deflector 14 pivots upwards. When fixed roof 1, and thus plate 13 and wind deflector 14 exhibit a convex curvature, the distance between wind deflector 14 and plate 13 in the transverse direction of the open roof construction will vary upon pivoting of wind deflector 14, but the cloth-like material, which functions as a sealing element, can absorb this variation by folding when the distance between wind deflector 14 and plate 13 becomes locally smaller than in the closed position of wind deflector 14. In the closed or inoperative position of wind deflector 14, on the other hand, the cloth-like material 15 is stretched tautly in the space between plate 13 and wind deflector 14.

The drawings furthermore show that plate 8 is provided with a lower portion 18 at the front edge of foldable cover 7 of the folding roof, over which lower portion the rear side of wind deflector 14 fits sealingly. In the embodiment illustrated, an upper surface of the wind deflector 14 is flush with an upper surface of the foldable cover 7. The drawings furthermore show that said lower portion 18 varies in length in the transverse direction of the folding roof, because the front edge of plate 8 of foldable cover 7 is arcuate, whilst the rear edge of wind deflector 14, and thus the rear edge of said lower portion 18 in plate 8, is straight.

Figure 4:
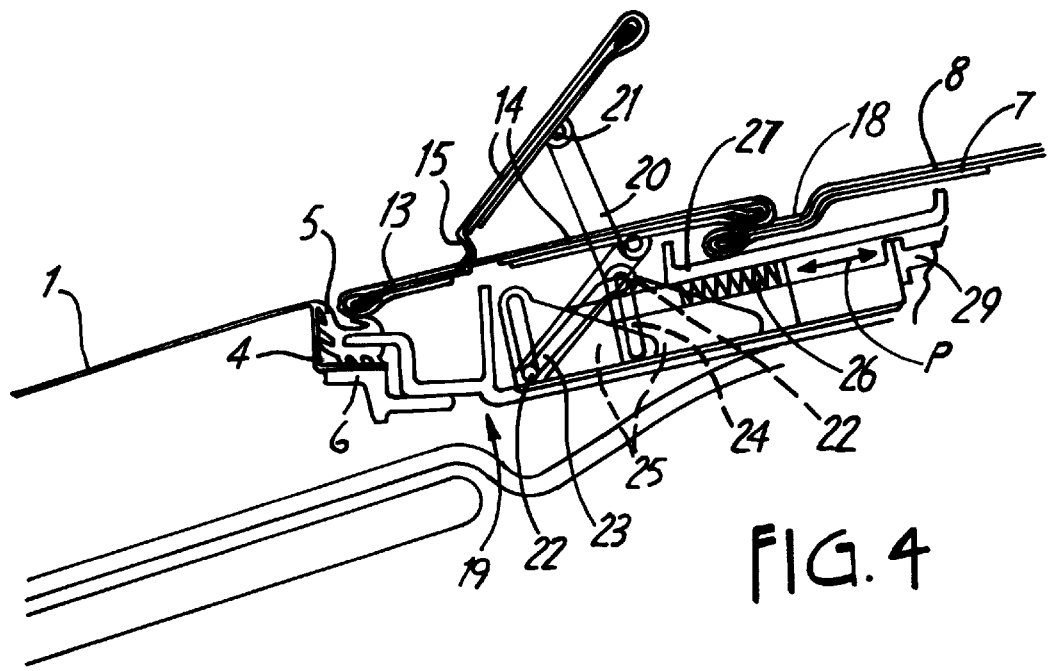

FIG. 4 shows that an adjusting mechanism 19 is provided at one lateral end, but preferably at two ends, for the purpose of adjusting wind deflector 14, which mechanism causes the wind deflector 14 to move upwards automatically upon opening of foldable cover 7. Each adjusting mechanism 19 comprises a lifting arm 20, which is pivotally connected to the wind deflector 14 at its upper end by means of a pivot 21 provided approximately halfway along the width of wind deflector 14, and which is pivotally supported by a guide pin 22 at its lower end. Guide pin 22 is guided in a guide slot 23 being formed in a stationary part of frame 3, which slopes upwards towards the rear along the larger part of its length and which comprises a short, horizontal rear part contiguous thereto. Guide pin 22 is also in engagement with a guide slot 24, which is provided in a slide 25. Slide 25 is capable of reciprocating movement in the longitudinal direction of frame 3, with guide slot 24 extending at least approximately perpendicularly to the direction of movement of slide 24. As a result of this, slots 23 and 24 intersect at an angle. The adjusting range of slide 25 is indicated by means of an arrow P in FIG. 4, while said figure furthermore shows that a spring element, in this case in the form of a compression spring 26, is retained between the rear side of slide 25 and the front side of a part 27 of frame 3, as a result of which slide 25 is biassed in a rearward direction. This implies that wind deflector 14 is biassed towards its upwardly pivoted, operative position. The drawing furthermore shows part of the operating beam 9, which functions as a driving slide 29 and which is capable of engaging on the rear side of slide 25 during the movement of operating beam 9 and of operating slide 25 during the final part of the closing movement and the initial part of the opening movement of the open roof, with spring 26 in the latter case ensuring that slide 25 follows the operating beam 9.

When slide 25 is moved, the two slots 23 and 24 will move with respect to each other, and because guide pin 22 must be positioned at the point of intersection between slots 23 and 24 in order to be able to be in engagement with the two slots, a shift of the intersecting point between slots 23 and 24 will result in movement of guide pin 22 through the two slots 23 and 24. As a result of this, guide pin 22 will move through guide slot 23 from its lowermost front position to its uppermost rear position, and lifting arm 20 will be moved upwards at its lower end when guide pin 22 makes this movement, so that lifting arm 20 will make a lifting movement, which movement is determined by the pivoting movement of wind deflector 14 about pivot pin 17 and the movement of guide pin 22 through slot 23.

Figure 5:
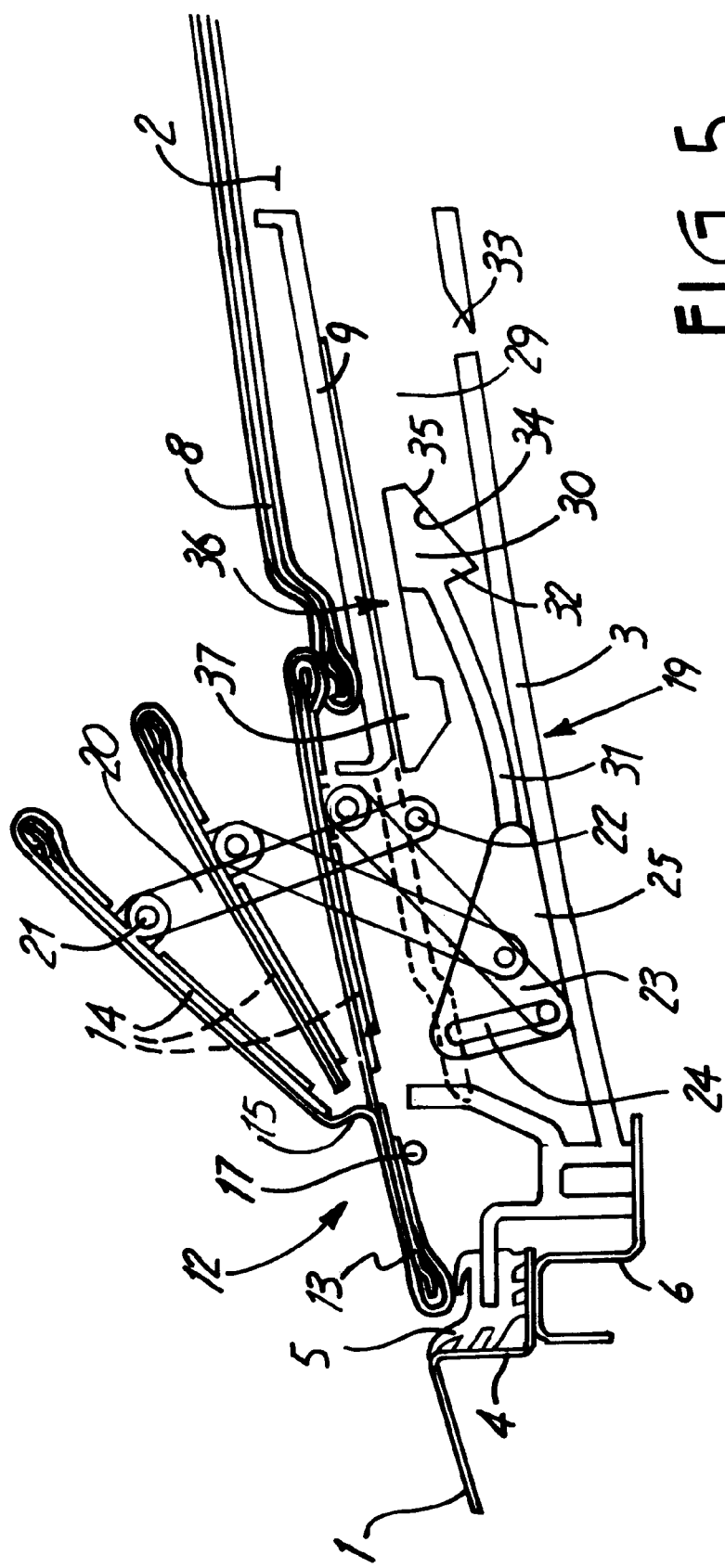
FIG. 5 is a sectional view corresponding to FIG. 4 of an alternative embodiment of the open roof construction according to the invention.

FIG. 5 shows another alternative embodiment of a driving arrangement for adjusting mechanism 19, wherein slide 25 is fitted with a locking-coupling mechanism, which couples the driven slide 25 of adjusting mechanism 19 to the driving slide 29 of operating beam 9 in positions of cover 7 near the closed position, and which disconnects the two slides 25 and 29 from each other and locks driven slide 25 in position with respect to stationary frame 3 in the other positions of foldable cover 7. The locking-coupling mechanism comprises a coupling element 30, which is movably (in vertical direction) connected to slide 25 via an elastic, flexible connecting portion 31. Coupling element 30 possesses a downwardly projecting cam portion 32, which is capable of engaging in a locking recess 33 in the guide rail of frame 3 in the rearmost position of driven slide 25, so as to lock slide 25 of adjusting mechanism 19, and thus of wind deflector 4, in its operative position.

Coupling element 30 furthermore comprises a wedge-shaped wall 34, which projects above the bottom of the guide rail of frame 3 upon engagement of coupling element 30 in locking recess 33, in such a manner that a front wedge portion 35 of driving slide 29 can engage under wedge-shaped wall 34 upon forward movement thereof and push coupling element 30 upwards so that cam portion 32 is lifted out of locking recess 33. Thus, the locking engagement of coupling element 30 with respect to stationary frame 3 is released and a coupling engagement between slides 25 and 29 is effected in forward direction.

Before wedge portion 35 pushes cam portion 32 of coupling element out of locking recess 33, a hook portion 36 has moved over coupling element 30. Once coupling element 30 has moved upwards out of locking recess 33, coupling element 30 is retained between wedge portion 35 and hook portion 36 of driving slide 29 with some play. Coupling element 30 will have been moved upwards in that case, over such a distance that hook 37 of hook portion 36 can engage coupling element 30 upon subsequent rearward movement of driving slide 29 when the folding roof is being opened, also if said coupling element 30 still extends slightly downwards when wedge portion 35 of driving slide 29 is being moved away from its position under coupling element 30, so that cam portion 32 will rest on the bottom of the guide rail of frame 3. Hook 37 of hook portion 36 will then carry along coupling element 30 in rearward direction, while raising wind deflector 14, until cam portion 32 of coupling element 30 snaps into locking recess 33, moving coupling element 30 down so far that hook 37 of hook portion 36 can pass over coupling element 30 so as to move operating beam 9 of the folding roof further towards the rear, whilst wind deflector 14 will remain in the raised position.

The invention is not restricted to the above-described embodiments as shown in the drawing, which can be varied in several ways without departing from the scope of the invention. Thus, the flexible sealing element could also function as a hinge for the pivoted plate/wind deflector, so that an additional pivot is not required. Furthermore, the part which is disposed before the pivoted plate, which part remains stationary, may also be formed by the stationary frame. The closing element may consist of several parts, whilst the stationary frame part may also consist of an integrated roof part or only of guide rails for driving mechanisms.

I claim:

1. An open roof construction for a vehicle having an opening in its fixed roof, comprising:

a stationary frame part to be secured to the roof;

an adjustable closing element supported by said stationary frame part, which is adjustable between a closed position, in which it closes said roof opening, and an open position, in which it opens said roof opening at least on a front side thereof for forward motion of the vehicle, wherein said closing element is provided on a side closest to the front side of the roof opening with a lowered portion;

a wind deflector which is disposed adjacently to the front side of the roof opening and which is adjustable between a lowered, inoperative position wherein a rear side of the wind deflector engages sealingly over the lowered portion of the closing element, and a raised, operative position, said wind deflector extending the whole width of the closing element and comprising a flexible sealing element which is fixedly connected to said wind deflector and a stationary part disposed between the front side of the roof opening and said wind deflector, wherein said stationary part is stationary during a change in position of the wind deflector.

2. The open roof construction according to claim 1, wherein the closing element comprises a front plate including said lowered portion, and a foldable cover connected to said front plate.

3. The open roof construction according to claim 1, and further comprising a position adjusting mechanism connected to said wind deflector.

4. The open roof construction according to claim 3, wherein the position adjusting mechanism comprises a lifting arm, which is pivotally connected to the wind deflector at one end-and which is in engagement at its other end with an at least partially sloping guide slot in said stationary frame part, and which is also drivingly connected to a driven slide.

5. The open roof construction according to claim 3, and further comprising a driving slide coupled to the closure element, the driving slide being operably coupled to the position adjusting mechanism, wherein the position adjusting mechanism is operated during the initial opening movement and the final closing movement of the closing element.

6. The open roof construction according to claim 5, and further comprising a locking-coupling mechanism provided between the driven slide of the position adjusting mechanism and the driving slide of the closing element, the locking-coupling mechanism coupling the driven slide and the driving slide together in positions of the closing element near the closed position thereof, and disconnecting the driven slide and the driving slide from each other and locking the driven slide in position with respect to the stationary frame part in other positions of the closing element.

7. The open roof construction according to claim 6, wherein the locking-coupling mechanism includes a coupling element which is moveable in a vertical direction and connected to the driven slide, the coupling element being retained in the driving slide in an upper position, near the closed positions of the closing element, for coupling the driven slide and the driving slide together, and wherein a locking recess is provided in said stationary frame part, in which the coupling element fits after being moved downwards from a coupling position to a locking position, in which the coupling element is disconnected from the driving slide and locks the driven slide of the position adjusting mechanism of the wind deflector in position.

8. The open roof construction according to claim 5, wherein said position adjusting mechanism includes a spring element which biases the driven slide to a position in which the wind deflector occupies its operative position, while the driving slide of the closing element can move the driven slide to a position in which the wind deflector occupies its inoperative position.

9. The open roof construction according to claim 1 wherein an upper surface of the wind deflector and an upper surface of the closure element are flush in the lowered position of the wind deflector.

10. An open roof construction for a vehicle having an opening in its fixed roof, comprising:

a stationary frame part to be secured to the roof;

an adjustable closing element supported by said stationary frame part, said closing element comprising a front plate and a foldable cover of cloth-like material connected thereto, said closing element being adjustable between a closed position, in which it closes said roof opening, and an open position, in which it opens said roof opening, at least on a front side thereof for forward motion of the vehicle, wherein said front plate is provided on a side closest to the front side of the roof opening with a lowered portion; and a wind deflector being disposed adjacently to the front side of the roof opening, said wind deflector being adjustable between a lowered, inoperative position and a raised, operative position, said wind deflector extending the whole width of the closing element and being covered with the same cloth-like material as the foldable cover, the rear side of the wind deflector fitting sealingly over the lowered portion of the closing element.

11. The open roof construction according to claim 10, wherein the stationary frame part includes a plate, whose upper side is flush with an upper side of the wind deflector in the inoperative position thereof.

12. The open roof construction according to claim 11, wherein said cloth-like sealing element extends over an entire upper area of said wind deflector and said plate, and wherein said cloth-like sealing element is stretched tautly between said plate and said wind deflector in the inoperative position of the wind deflector.

13. The open roof construction according to claim 12, wherein a support for said wind deflector and a support for said plate are interconnected by a pivot pin.

14. The open roof construction according to claim 10, and further comprising a position adjusting mechanism connected to said wind deflector.

15. The open roof construction according to claim 8, wherein the position adjusting mechanism comprises a lifting arm, which is pivotally connected to the wind deflector at one end and which is in engagement at its other end with an at least partially sloping guide slot in said stationary frame part, and which is also drivingly connected to a driven slide.

16. The open roof construction according to claim 14, and further comprising a driving slide coupled to the closure element, the driving slide being operably coupled to the position adjusting mechanism, wherein the position adjusting mechanism is operated during the initial opening movement and the final closing movement of the closing element.

17. The open roof construction according to claim 16, and further comprising a locking-coupling mechanism provided between the driven slide of the position adjusting mechanism and the driving slide of the closing element, the locking-coupling mechanism coupling the driven slide and the driving slide together in positions of the closing element near the closed position thereof, and disconnecting the driven slide and the driving slide from each other and locking the driven slide in position with respect to the stationary frame part in other positions of the closing element.

18. The open roof construction according to claim 17, wherein the locking-coupling mechanism includes a coupling element which is moveable in a vertical direction and connected to the driven slide, the coupling element being retained in the driving slide in an upper position, near the closed positions of the closing element, for coupling the driven slide and the driving slide together, and wherein a locking recess is provided in said stationary frame part, in which the coupling element fits after being moved downwards from a coupling position to a locking position, in which the coupling element is disconnected from the driving slide and locks the driven slide of the position adjusting mechanism of the wind deflector in position.

19. The open roof construction according to claim 16, wherein said position adjusting mechanism includes a spring element which biases the driven slide to a position in which the wind deflector occupies its operative position, while the driving slide of the closing element can move the driven slide to a position in which the wind deflector occupies its inoperative position.

* * * * *